United States Patent
Vaughn et al.

(10) Patent No.: US 9,908,618 B2
(45) Date of Patent: *Mar. 6, 2018

(54) ADJUSTABLE WEIGHT DISTRIBUTION FOR DRONE

(71) Applicant: QUALCOMM Incorporated, San Diego, CA (US)

(72) Inventors: Brad Lee Vaughn, Carlsbad, CA (US); Charles Wheeler Sweet, San Diego, CA (US); Vincent Kemler, San Diego, CA (US); Aine Mary Shivnan, Encinitas, CA (US); Kaustubh Balkrishna Gondkar, San Diego, CA (US); James York Wilson, Trabuco Canyon, CA (US); Michael Franco Taveira, San Diego, CA (US); Donald Hutson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/285,717

(22) Filed: Oct. 5, 2016

(65) Prior Publication Data

US 2017/0021915 A1 Jan. 26, 2017

Related U.S. Application Data

(63) Continuation of application No. 14/643,070, filed on Mar. 10, 2015, now Pat. No. 9,469,394.

(51) Int. Cl.
*G05D 1/00* (2006.01)
*G05D 3/00* (2006.01)
(Continued)

(52) U.S. Cl.
CPC ............. *B64C 17/02* (2013.01); *A63H 27/12* (2013.01); *B64C 27/08* (2013.01); *B64C 39/024* (2013.01);
(Continued)

(58) Field of Classification Search
CPC . B64C 2201/027; B64C 39/024; B64C 27/08; B64C 2201/024; B64C 17/02;
(Continued)

(56) References Cited

U.S. PATENT DOCUMENTS 3,656,723 A * 4/1972 Piasecki .................. B64C 27/12
244/2
3,985,320 A * 10/1976 Brady ..................... B64C 17/06
114/124

(Continued)

FOREIGN PATENT DOCUMENTS

CN 104176247 A 12/2014
DE 102005012744 A1 4/2006
(Continued)

OTHER PUBLICATIONS

International Search Report and Written Opinion—PCT/US2016/012829 ISA/EPO—May 2, 2016.
(Continued)

*Primary Examiner* — Jelani A Smith
*Assistant Examiner* — Luis A Martinez Borrero
(74) *Attorney, Agent, or Firm* — The Marbury Law Group

(57) ABSTRACT

Apparatus, methods, and systems for adjusting a center of mass of a drone may include a balance track and a repositionable weight. The balance track may be configured to extend outwardly from a central region of the drone. The balance track may include a plurality of weight-balance fixation positions. The repositionable weight may be con-
(Continued)

figured to be secured at any one of the plurality of weight-balance fixation positions. In various embodiments the repositionable weight may include an electronic component. Various embodiments may include a another balance track configured to extend outwardly from the central region along a second axis that is different from a first axis of the other balance track.

28 Claims, 8 Drawing Sheets

(51) Int. Cl.
    *B64C 17/02*      (2006.01)
    *A63H 27/00*      (2006.01)
    *B64C 39/02*      (2006.01)
    *B64C 27/08*      (2006.01)

(52) U.S. Cl.
    CPC ...... *G05D 1/0011* (2013.01); *B64C 2201/027* (2013.01); *B64C 2201/146* (2013.01)

(58) Field of Classification Search
    CPC .............. B64C 2201/108; B64C 27/32; B64C 2027/7266; B64C 2201/127; B64C 13/50; B64D 45/0005; B64D 17/40; B64D 47/08; B64D 2045/007; B64D 11/003; G05D 2201/0209; G05D 2201/0212; G05D 1/0289; G05D 2201/0213; G05D 1/024
    USPC ..... 701/117, 13, 2, 3, 4, 411, 412, 467, 533, 701/8, 7, 11, 15
    See application file for complete search history.

(56) References Cited

U.S. PATENT DOCUMENTS

| | | | |
|---|---|---|---|
| 5,115,996 A | 5/1992 | Moller | |
| 6,119,976 A * | 9/2000 | Rogers | B64C 39/024 244/13 |
| 6,406,409 B1 * | 6/2002 | Silver | A63B 71/0036 482/104 |
| 6,533,220 B2 * | 3/2003 | Schuster | B64D 1/22 244/118.1 |
| 6,742,741 B1 * | 6/2004 | Rivoli | B64C 3/40 244/12.1 |
| 6,923,404 B1 * | 8/2005 | Liu | B64C 3/40 244/46 |
| 7,364,114 B2 * | 4/2008 | Wobben | B64C 27/20 244/12.3 |
| 8,000,849 B2 * | 8/2011 | Reich | B64C 13/20 701/10 |
| 8,109,802 B2 * | 2/2012 | Chui | A63H 27/12 446/36 |
| 8,205,822 B1 | 6/2012 | Jameson et al. | |
| 8,292,215 B2 * | 10/2012 | Olm | B64C 39/024 244/17.23 |
| 8,353,199 B1 | 1/2013 | Ma et al. | |
| 8,622,336 B2 * | 1/2014 | Brenner | B64D 1/22 244/137.1 |
| 8,721,383 B2 * | 5/2014 | Woodworth | B64C 15/00 244/12.4 |
| 8,794,566 B2 | 8/2014 | Hutson | |
| 8,931,730 B2 * | 1/2015 | Wang | B64C 39/028 244/100 R |
| 9,061,763 B1 * | 6/2015 | Christensen | A63H 17/28 |
| 9,199,733 B2 * | 12/2015 | Keennon | B64C 27/12 |
| 9,205,922 B1 * | 12/2015 | Bouwer | B64D 9/00 |
| 9,272,784 B2 * | 3/2016 | Nelson | B64C 27/26 |
| 9,469,394 B2 * | 10/2016 | Vaughn | A63H 27/12 |
| 9,487,290 B2 * | 11/2016 | Sherrill | B64C 27/473 |
| 9,550,561 B1 * | 1/2017 | Beckman | B64C 17/00 |
| 9,598,171 B2 * | 3/2017 | Olm | B60F 5/02 |
| 9,704,409 B2 * | 7/2017 | Prakash | B64C 39/024 |
| 9,738,380 B2 * | 8/2017 | Claridge | B64C 19/00 |
| 2002/0184965 A1 * | 12/2002 | Honda | F16F 15/363 74/574.1 |
| 2006/0226281 A1 * | 10/2006 | Walton | B64C 27/20 244/17.23 |
| 2006/0228105 A1 * | 10/2006 | Chapman | B66F 11/048 396/419 |
| 2007/0145182 A1 | 6/2007 | Page | |
| 2009/0114773 A1 | 5/2009 | Helou, Jr. | |
| 2009/0134273 A1 | 5/2009 | Page et al. | |
| 2009/0283629 A1 * | 11/2009 | Kroetsch | A63H 27/12 244/17.23 |
| 2009/0299551 A1 * | 12/2009 | So | B64C 39/024 701/3 |
| 2010/0278656 A1 * | 11/2010 | Taya | F04D 29/324 416/241 A |
| 2011/0002785 A1 * | 1/2011 | Cawthorne | B64C 27/008 416/144 |
| 2011/0139928 A1 | 6/2011 | Morris et al. | |
| 2011/0158809 A1 * | 6/2011 | Luo | A63H 27/12 416/112 |
| 2012/0032025 A1 * | 2/2012 | Allen | B64F 1/02 244/110 C |
| 2012/0221291 A1 | 8/2012 | Han et al. | |
| 2012/0298793 A1 * | 11/2012 | Weddendorf | F03D 1/02 244/17.23 |
| 2013/0206915 A1 | 8/2013 | Desaulniers | |
| 2014/0064978 A1 * | 3/2014 | Somenzini | B64C 11/008 416/223 R |
| 2014/0217230 A1 | 8/2014 | Helou, Jr. | |
| 2014/0316616 A1 * | 10/2014 | Kugelmass | G05D 1/101 701/8 |
| 2015/0014475 A1 * | 1/2015 | Taylor | B64C 39/024 244/6 |
| 2015/0032297 A1 | 1/2015 | Loewen et al. | |
| 2015/0136897 A1 * | 5/2015 | Seibel | B64C 29/0033 244/6 |
| 2015/0329204 A1 * | 11/2015 | Nelson | B64C 27/26 244/6 |
| 2015/0336871 A1 | 11/2015 | Winn et al. | |
| 2016/0033855 A1 * | 2/2016 | Wong | G03B 37/00 353/13 |
| 2016/0039541 A1 * | 2/2016 | Beardsley | B60L 11/1816 701/2 |
| 2016/0059958 A1 * | 3/2016 | Kvitnevskiy | B64C 27/52 701/3 |
| 2016/0159472 A1 * | 6/2016 | Chan | B64C 27/08 244/39 |
| 2016/0246304 A1 | 8/2016 | Canoy et al. | |
| 2016/0264234 A1 * | 9/2016 | Vaughn | A63H 27/12 |
| 2016/0272310 A1 * | 9/2016 | Chan | B64C 27/08 |
| 2016/0304199 A1 * | 10/2016 | Chan | B64C 39/024 |
| 2017/0305570 A1 * | 10/2017 | Heinonen | B64D 43/00 |

FOREIGN PATENT DOCUMENTS

| | | |
|---|---|---|
| EP | 1901153 A1 | 3/2008 |
| GB | 2270510 A | 3/1994 |
| GB | 2455374 A | 6/2009 |

OTHER PUBLICATIONS

Pounds P.E.I., et al., "Stability of small-scale UAV helicopters and quadrotors with added payload mass under PID control," Auton Robot, 2012, vol. 33, pp. 129-142.

\* cited by examiner

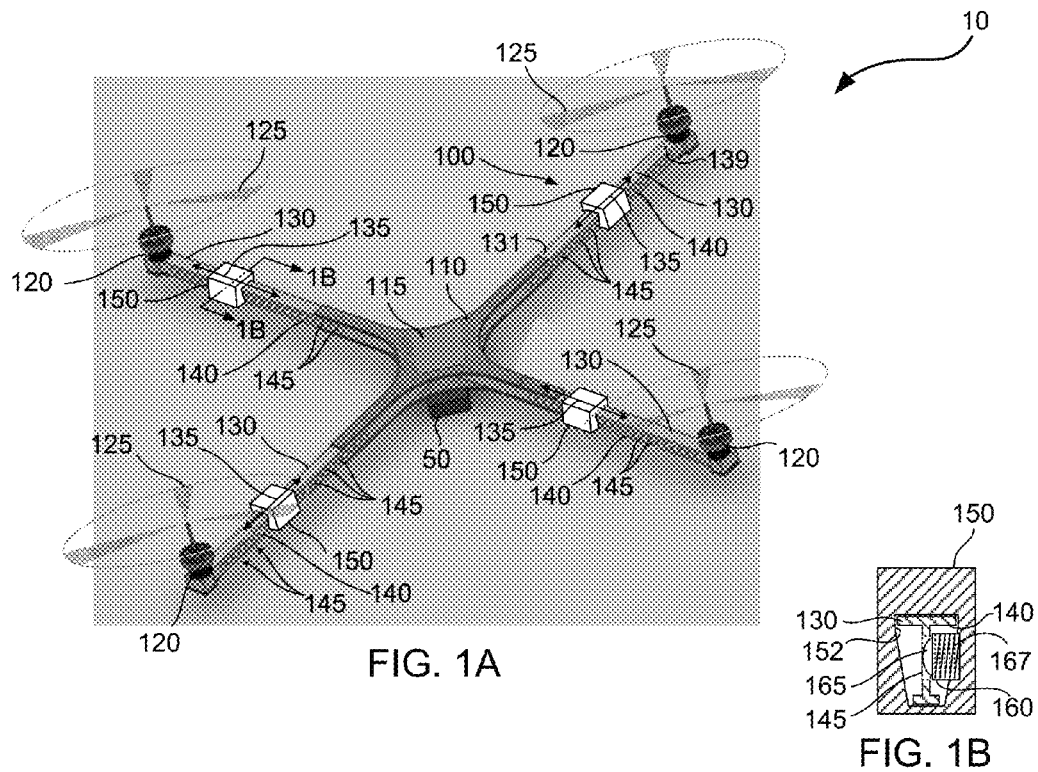
FIG. 1A
FIG. 1B
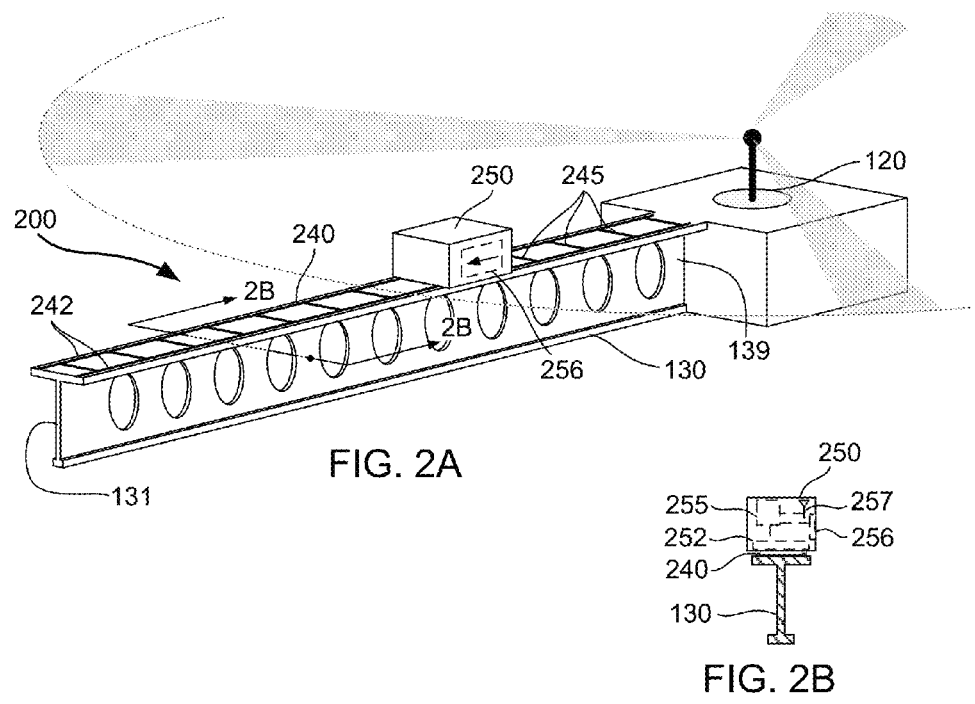
FIG. 2A
FIG. 2B

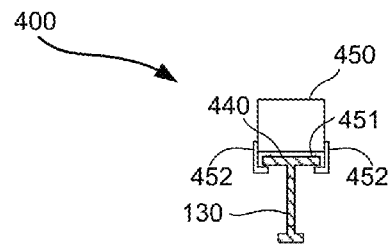
FIG. 4
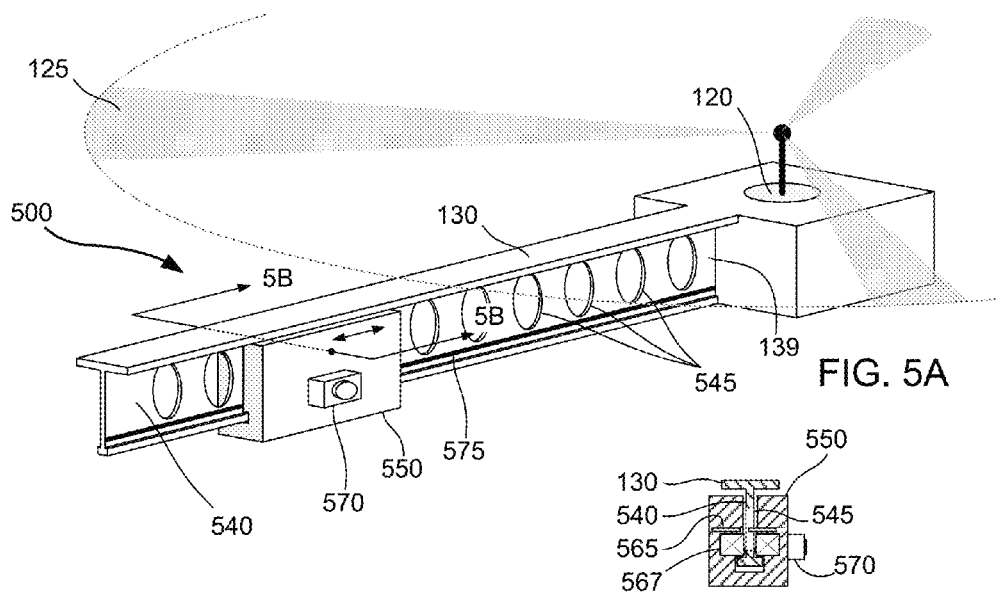
FIG. 5A
FIG. 5B
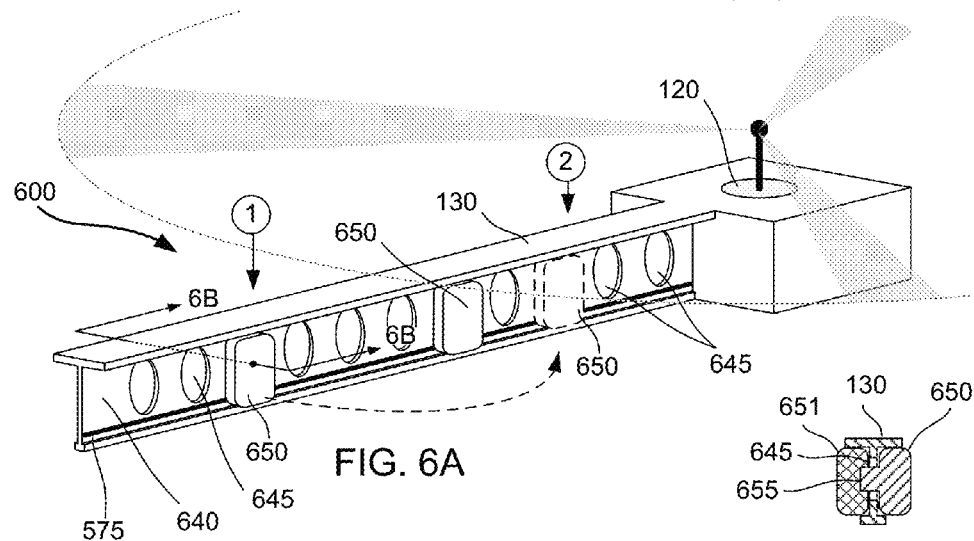
FIG. 6A
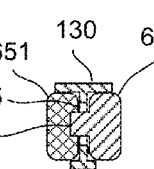
FIG. 6B

ADJUSTABLE WEIGHT DISTRIBUTION FOR DRONE

RELATED APPLICATIONS

This application is a continuation of U.S. Non-provisional patent application Ser. No. 14/643,070 entitled "Adjustable Weight Distribution for Drone" filed Mar. 10, 2015, the entire contents of which are hereby incorporated by reference for all purposes.

BACKGROUND

A multi-rotor helicopter drone (referred to herein as a "drone") is an unmanned aerial vehicle that uses a plurality of powered rotors for lift and propulsion. For example, a quad-copter, also called a quad-rotor helicopter or quad-rotor, is a drone that uses four powered rotors for lift and propulsion. Similarly, an octo-copter includes eight powered rotors. As with most aerial vehicles, drones are generally balanced to provide orientation stability while the rotor speeds are varied to maintain a desired orientation (i.e., roll, pitch, or yaw). Balancing the airframe of the drone is important because if the drone is out of balance, the rotors may expend more energy just to maintain level flight. However, small adjustments or additions to the airframe of the drone (e.g., added payload or components, like a camera or lens) can change the weight distribution and cause the airframe to be out of balance.

SUMMARY

Various embodiments include a weight distribution apparatus for adjusting a center of mass of a drone, such as a multi-rotor helicopter drone, including a first balance track and a repositionable weight. The first balance track may extend outwardly from a central region of the drone. The repositionable weight may be an electronic component configured to be secured along the first balance track.

In various embodiments, the repositionable weight may be slidable along the first balance track between a plurality of weight-balance fixation positions. The first balance track may be disposed on an extension arm of the drone. The extension arm may extend laterally from the central region, with a distal end of the extension arm supporting an air propulsion unit. The repositionable weight may wrap around at least a portion of the extension arm using an essential structural shape of the extension arm as the first balance track. The plurality of weight-balance fixation positions may include a series of apertures extending through the extension arm. The repositionable weight may be configured to ride along guide elements included on the first balance track. The repositionable weight may include an electronic component, such as an energy cell, an actuator, an indicator, a circuit element, a sensor, and/or a camera. The weight distribution apparatus may also include a control unit configured to activate the electronic component. The control unit may be fixed to the repositionable weight. The control unit may be configured to activate the electronic component, such as when the control unit is remote from the repositionable weight. The control unit may be configured to activate the electronic component. In addition, the control unit may include a radio frequency transceiver and a processor coupled to the radio frequency transceiver. The processor may be configured with processor-executable instructions to activate a movement of the repositionable weight from a first one of the plurality of weight-balance fixation positions to a second one of the plurality of weight-balance fixation positions in response to receiving an activation signal via the radio frequency transceiver.

In various embodiments, the repositionable weight may be removably secured to at least one of the plurality of weight-balance fixation positions. The plurality of weight-balance fixation positions may be evenly distributed along a longitudinal extent of the first balance track. In addition, a second balance track may extend outwardly from the central region along a second axis that may be different from a first axis of the first balance track. The first axis may intersect the second axis at a non-orthogonal angle. Further, a third balance track may extend away from the central region along a third axis that may be different from both the first axis and the second axis. The first axis may be parallel to the second axis. Also, the first and second axes may not be parallel to extension arms supporting rotors of the drone. The first balance track may be configured to change length for changing the repositionable weight from a first one of the plurality of weight-balance fixation positions to a second one of the plurality of weight-balance fixation positions. The first balance track may be configured to rotate about a vertical central axis of the drone. In response to a change in a weight-distribution balance profile of the drone, in which a payload is added to or removed from the drone, the plurality of weight-balance fixation positions may be arranged such that the repositionable weight may be repositioned to a different one of the plurality of weight-balance fixation positions in order to restore the weight-distribution balance profile. The plurality of weight-balance fixation positions may be arranged such that changing the repositionable weight from a first one of the plurality of weight-balance fixation positions to a second one of the plurality of weight-balance fixation positions may change the center of mass of the drone.

Various embodiments may further include a method of adjusting a center of mass of a drone using a weight distribution apparatus. The method may include receiving a weight-distribution input relating to balancing the multi-rotor helicopter drone. In addition, a processor may determine a weight-distribution balance profile based on the weight-distribution input. The processor may also determine whether a first repositionable weight should be repositioned. A signal may be output in response to determining that the first repositionable weight should be repositioned on the first balance track according to the weight-distribution balance profile.

In various embodiments, the signal may be used to reposition the first repositionable weight in a variety of ways. In some embodiments, the signal may cause an actuator to release the first repositionable weight for removal from a first balance track in order to conform to the weight-distribution balance profile. In some embodiments, the signal may cause an actuator to move the first repositionable weight along a first balance track between a plurality of weight-balance fixation positions. In some embodiments, the signal may cause the actuator to rotate the first balance track about a vertical central axis of the drone in order to change the first repositionable weight from a first one of a plurality of weight-balance fixation positions to a second one of the plurality of weight-balance fixation positions. The signal may cause the actuator to rotate the first balance track to propel the drone with direct engagement along a surface.

In some embodiments, the weight-distribution input may be received from a remote source. In some embodiments, the signal may cause an indicator to indicate that the first repositionable weight should be repositioned. In some embodiments, the signal may cause an indicator to indicate that the first repositionable weight should be moved along a first balance track between a plurality of weight-balance fixation positions. In some embodiments, the signal may cause an indicator to indicate that the first repositionable weight should be removed from a first balance track in order to conform to the weight-distribution balance profile. In some embodiments, the signal may cause an indicator to indicate that a second repositionable weight should be added in order to conform to the weight-distribution balance profile. In some embodiments, the signal may cause an indicator to indicate that a length of a first balance track should be changed in order to change the first repositionable weight from a first one of a plurality of weight-balance fixation positions to a second one of the plurality of weight-balance fixation positions. In some embodiments, the signal may cause an indicator to indicate that a first balance track should be rotated about a vertical central axis of the drone in order to change the first repositionable weight from a first one of a plurality of weight-balance fixation positions to a second one of the plurality of weight-balance fixation positions. In some embodiments, the indicator may be on the drone and/or remote from the drone.

In various embodiments, the method may further include repositioning a position of the first repositionable weight may be changed among the plurality of weight-balance fixation positions on a first balance track extending outwardly from a central region of the drone. Repositioning the position of the first repositionable weight may be in response to determining that the first repositionable weight should be repositioned. Repositioning the repositionable weight to a different one of the plurality of weight-balance fixation positions may be in response to a change in a weight-distribution balance profile of the drone from a payload being added to or removed from the drone. The plurality of weight-balance fixation positions may be arranged such that repositioning the repositionable weight restores the weight-distribution balance profile. The repositionable weight may be repositioned from a first one of the plurality of weight-balance fixation positions to a second one of the plurality of weight-balance fixation positions. The plurality of weight-balance fixation positions may be arranged such that repositioning the repositionable weight changes the center of mass of the drone. The first repositionable weight may be a payload temporarily carried by the drone.

Various embodiments may include a weight distribution apparatus that includes a means for adjusting the center of mass of the drone and a means for adding weight to the drone. The means for adjusting the center of mass of the drone may be configured to extend outwardly from a central region of the drone. The means for adjusting the center of mass of the drone may include a plurality of weight-balance fixation positions. The means for adding weight to the drone may be configured to be secured at any one of the plurality of weight-balance fixation positions. The means for adding weight to the drone may include an electronic component.

Various embodiments may include a weight distribution apparatus that includes a first and a second means for adjusting the center of mass of the drone and a means for adding weight to the drone. The first means for adjusting the center of mass of the drone may be configured to extend outwardly from a central region of the drone. The first means for adjusting the center of mass of the drone may include a plurality of weight-balance fixation positions. The second means for adjusting the center of mass of the drone may be configured to extend outwardly from the central region along a second axis that is different from a first axis of the first means for adjusting the center of mass of the drone. The means for adding weight to the drone may be configured to be secured at any one of the plurality of weight-balance fixation positions.

Various embodiments may further include a drone with means for performing functions of one or more embodiments summarized herein.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

FIG. 1A shows a perspective view of a drone according to various embodiments.

FIG. 1B is a cross-sectional view of the drone of FIG. 1A at 1B-1B according to various embodiments.

FIG. 2A is an isolated view of an extension arm with a weight distribution apparatus according to various embodiments.

FIG. 2B is a cross-sectional view the extension arm of FIG. 2A at 2B-2B according to various embodiments.

FIG. 4 is a cross-sectional view of a weight distribution apparatus according to various embodiments.

FIG. 5A is an isolated view of an extension arm with a weight distribution apparatus according to various embodiments.

FIG. 5B is a cross-sectional view of the extension arm of FIG. 5A at 5B-5B according to various embodiments.

FIG. 6A is an isolated view of an extension arm with a weight distribution apparatus according to various embodiments.

FIG. 6B is a cross-sectional view of the extension arm of FIG. 6A at 6B-6B according to various embodiments.

DETAILED DESCRIPTION

Figure 3:
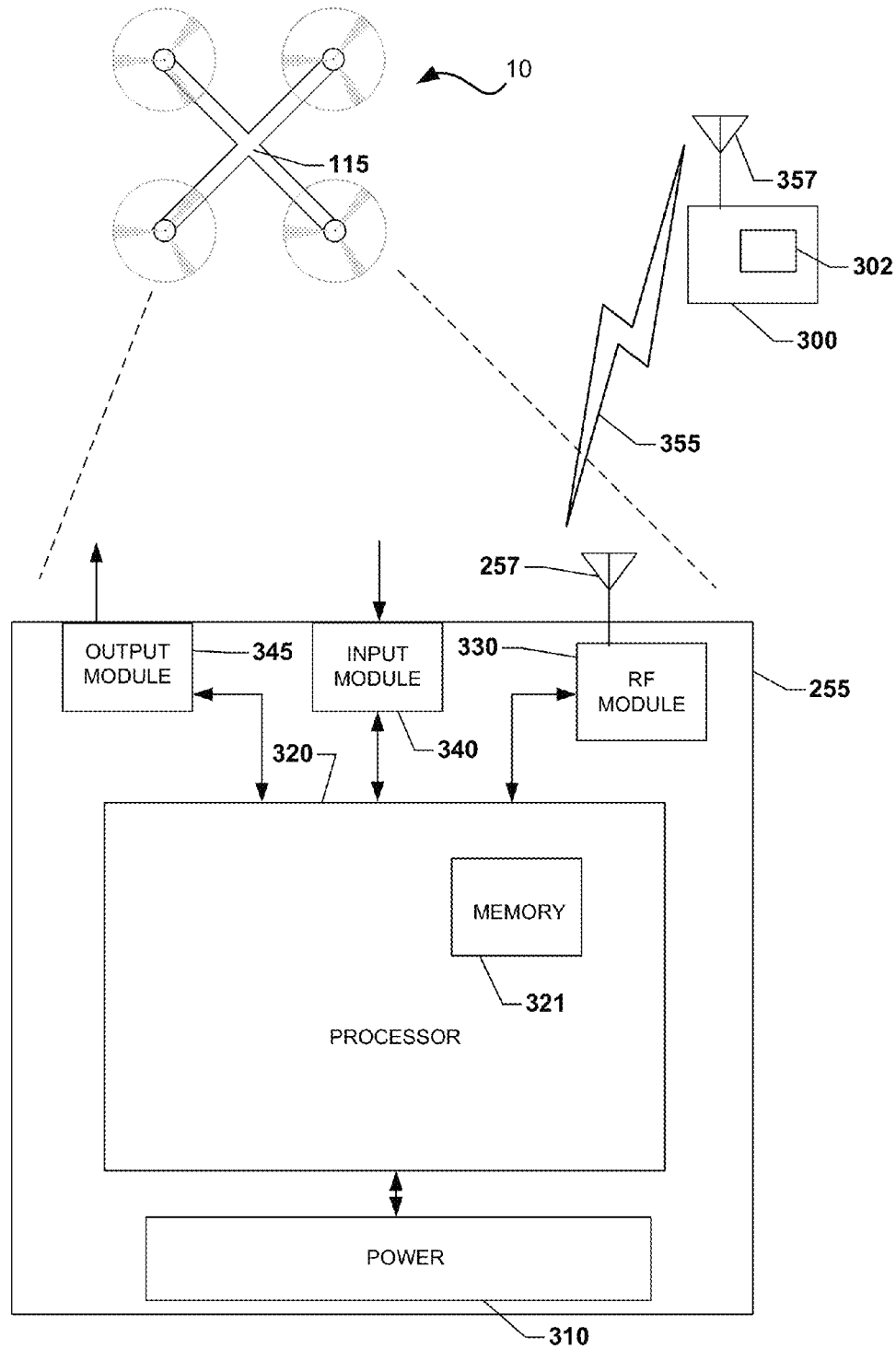
FIG. 3 is a top view of a drone and a schematic relief diagram of a control unit and remote communication device according to various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include a weight distribution apparatus, system, and/or method for adjusting a center of mass of a drone, such as a multi-rotor helicopter drone. The combined weights of the multi-rotor helicopter drone, including any payload, may be taken into account to achieve a desired center of mass for the combined masses. In accordance with various embodiments, the center of mass of the drone may be adjusted using one or more balance tracks extending outwardly from a central region of the drone. The balance tracks may each include a plurality of weight-balance fixation positions configured to receive a repositionable weight for achieving the desired center of mass. The repositionable weights, when positioned in an appropriate weight-balance fixation position, may balance the drone to compensate for imbalances from payloads, such as temporarily transported packages for newly added components. In this way, balance may be achieved despite the removal of payload(s) or the addition of new, unusual, or different payloads.

In various embodiments, a payload carried by the drone, such as a component having a purpose other than to balance the drone, may be used as the repositionable weights. The drone may be re-balanced by changing a position of the payload or a payload attachment tether to a selected weight-balance fixation position. Using the payload as the repositionable weight eliminates or minimizes the need for added weight that serves no purpose other than to balance the drone.

The terms "multi-rotor helicopter drone" and "drone" are used interchangeably herein to refer to an unmanned aerial vehicle. A drone may generally be configured to fly autonomously, semi-autonomously, or controlled wirelessly by a remote piloting system that is automated and/or manually controlled. A drone may be propelled for flight in any of a number of known ways. For example, a plurality of propulsion units, each including one or more propellers, may provide propulsion or lifting forces for the drone and any payload carried by the drone. One or more types of power source, such as electrical, chemical, electro-chemical, or other power reserve may power the propulsion units.

As used herein, the terms "center of mass" refer to the point in, on, or near the drone at which the whole mass of the drone, including the payload, may be considered as concentrated. A change in the center of mass of the drone may provide balance, which may equate to stability and/or increased efficiency powering propulsion units in flight.

As used herein, the term "payload" refers to any load carried by the drone that may be removed from or repositioned on the drone. Payload may include things that are carried by the drone, including instruments (e.g., cameras, sensors, etc.), components, and packages. Payload may include temporary items, such as packages, that are carried by the drone for a limited duration. In addition, payload may include long-term or permanent items necessary for the operation of the drone. Payloads may be directly attached to the airframe, such as via a payload attachment fixture, or carried beneath the airframe on a tether.

As used herein, the term "actuator" refers to a mechanical device that converts energy into motion, by which a control system may act upon an environment. The source of energy may be, for example, an electric current, hydraulic fluid pressure, pneumatic pressure, mechanical energy, thermal energy, or magnetic energy. For example, an electric motor assembly may be a type of actuator that converts electric current into a rotary motion, and may further convert the rotary motion into a linear motion to execute movement. In this way, an actuator may include a motor, gear, linkage, wheel, screw, pump, piston, switch, servo, or other element for converting one form of energy into motion.

Various embodiments may be implemented on different types of multi-rotor helicopter drones, such as a quad-copter drone 10 illustrated in FIG. 1A. The drone 10 may include a weight distribution apparatus 100 for adjusting a center of mass thereof. The drone 10 may include a frame 110 and a plurality of air propulsion units 120 supported on extension arms 130. FIG. 1A illustrates four air propulsion units 120, each mounted on a distal end 139 of a separate extension arm 130. Each of the air propulsion units 120 may include a propeller 125. The air propulsion units 120 may collectively provide vertical and/or horizontal propulsion. In addition, varying levels of power may be supplied to individual air propulsion units 120 for controlling stability and maneuverability during take-off, landing, and in flight. The frame 110 may also support various other components (not shown), including controls, actuators, power sources, cameras/sensors, circuit elements, and communication systems.

The drone 10 may generally fly in any unobstructed horizontal and vertical direction or may hover in one place. In addition, the drone 10 may be configured with processing and communication devices that enable the drone 10 to navigate, such as by controlling the air propulsion units 120 to achieve flight directionality and to receive position information and information from other system components including vehicle systems, package delivery service servers and so on. The position information may be associated with the current position of the drone 10 and the location of the delivery or other destination.

For ease of description and illustration, some details of the drone 10 are omitted, such as wiring, frame structure interconnects or other features that would be known to one of skill in the art. For example, while the drone 10 is described as having extension arms 130 secured to the frame 110, a drone may be constructed with a frame integrally formed with the extension arms 130. In various embodiments, the drone 10 includes four air propulsion units 120, but more or fewer air propulsion units 120 may be used.

In various embodiments, the drone 10 may include the weight distribution apparatus 100 for adjusting a center of mass of the drone 10. In some embodiments, the weight distribution apparatus 100 may include a balance track 140 configured to receive a repositionable weight 150 for adjusting the center of mass. The balance track 140 may extend laterally away from a central portion 115 of the frame 110. In addition, the balance track 140 may include a plurality of weight-balance fixation positions 145 spaced apart along a longitudinal extent of the balance track 140. Each of the weight-balance fixation positions 145 may be disposed a different horizontal distance from a center (e.g., center of the central portion 115) of the drone 10. Each repositionable weight 150 provides a weight force acting on the balance track 140 at the weight-balance fixation position 145 in which it is secured. In particular, a center of mass of each repositionable weight 150 may be configured to provide the weight force at a precise load location relative to the weight-balance fixation position 145 (e.g., a center of each weight-balance fixation position 145). A distance from the center of the drone 10 to the precise load location, multiplied by the weight of the repositionable weight 150, equals a rotational balancing force, in a pitch or yaw direction, provided by the repositionable weight 150. In this way, the weight-balance fixation positions 145 disposed closer to the central portion 115 (i.e., closer to a proximal end 131 of the extension arm 130) are associated with smaller rotational balancing forces than the weight-balance fixation positions 145 disposed furthest from the central portion 115 (i.e., closer to the distal end 139 of the extension arm 130). Both the weight of the repositionable weight 150 and the weight-balance fixation positions 145 to which the repositionable weight 150 is attached or otherwise coupled may be selected based on the amount of balancing force needed to offset imbalances in the frame 110, such as from an attached payload 50. In other words, securing the repositionable weight 150 in one of the weight-balance fixation positions 145 shifts the center of mass of the drone 10 by a determinable amount. The weight-balance fixation positions 145 are illustrated as being evenly spaced, but other spacing may be used. For example, the spacing may incrementally get smaller or greater along an extent of the balance track 140.

By including more than one balance track 140 extending in different directions from the central portion 115, the weight distribution apparatus 100 may enable adjustment of the center of mass along two axes. Individual repositionable weights 150 on different balance tracks 140 may be placed (e.g., removably secured) at different distances from the central portion 115 in order to balance the drone 10.

The repositionable weights 150 may be removably secured, meaning that the repositionable weights 150 may each be separately attached to the balance track 140, but subsequently removed from the balance track 140 for repositioning the weights. In addition, in order to conform to a determined weight-distribution profile, one or more of the repositionable weights 150 may be removed from the balance track 140, and not repositioned thereon.

The drone 10 may include pairs of the balance tracks 140 extending in opposite directions from the central portion 115 and along a longitudinal axis 135 (indicated as double-headed arrows in FIG. 1A) common to both balance tracks 140. One of the longitudinal axes 135 of a first pair of extension arms 130 may extend perpendicular to another one of the longitudinal axis 135 of a second pair of the extension arms 130.

The frame 110 may also carry a payload 50 (e.g., one or more packages), using package securing elements, such as fasteners or a suitable compartment (not shown). The drone 10 may be equipped with a package-securing unit (not shown), such as a gripping and release mechanism, with a motor and so on, configured to at least temporarily grasp and hold the payload 50. The payload 50 may be a single unitary element or multiple elements grouped together or separately. In addition, the payload 50 may be one or more packages or components carried by the drone 10 on a short-term basis, long-term basis, permanently, or some combination thereof. While the payload 50 is illustrated in FIG. 1A as being attached in the central portion 115 underneath the frame 110, the payload may alternatively be attached atop the frame 110 or any other suitable location. Also, the payload 50 may be attached via a tether connected to an attachment structure or winch instead of directly to the frame 110.

FIG. 1B is a cross-sectional view of the balance track 140 at cross-section 1B-1B in FIG. 1A illustrating the balance track 140, which is an integral part of the structure of the extension arm 130, supporting the repositionable weight 150 according to some embodiments. With reference to FIGS. 1A and 1B, the structure of the extension arm 130 may form all or part of the balance track 140 and/or the plurality of weight-balance fixation positions 145. For example, the structure of the extension arm 130 may include structural shape that lends rigidity to the arm, such as a T-beam or I-beam cross-section. A part of the structure of the extension arm 130 may be used as the balance track 140. In addition, a series of apertures may be formed in the extension arm 130 for reducing weight or providing other structural or aeronautical characteristics. Those same apertures may be used as the plurality of weight-balance fixation positions 145.

In some embodiments (e.g., FIG. 1B), the repositionable weight 150 wraps completely around the extension arm 130, like a sleeve surrounding a segment of the extension arm 130. In such embodiments, the repositionable weight 150 may include an interior passage 152 with a cross-sectional shape that matches a portion of the balance track 140 for guiding the repositionable weight along the balance track 140. In this way, the repositionable weight 150 may not be easily separated from the drone 10. The repositionable weight 150 may include a portion that separates for removing the repositionable weight 150 from the extension arm 130. Alternatively, the repositionable weight 150 need not wrap all the way around the extension arm 130, but just enough to guide and/or ensure the repositionable weight 150 does not separate from the balance track 140 (i.e., the extension arm).

The repositionable weight 150 may be removably secured to the balance track 140 and selectively released for manually moving to a different position along the balance track 140. Once secured to the balance track 140, the repositionable weight 150 may remain fixed in at least one of the plurality of weight-balance fixation positions 145.

A fastener 160 may maintain the repositionable weight 150 in a particular one of the plurality of weight-balance fixation positions 145. For example, the fastener 160 may include a spring 167 that biases a ball 165 toward the extension arm 130. In this example structure, when the ball 165 is aligned with one of the apertures forming the weight-balance fixation positions 145, the ball 165 may be at least partially seated within that aligned aperture. The spring 167 may be selected to provide a suitable biasing force in order to hold the ball 165 in the aligned aperture and thereby hold in-place the repositionable weight 150. The biasing force may also be light enough that a manual sliding of the repositionable weight 150 along the extension arm will force the ball 165 out of the aligned aperture and allow the repositionable weight 150 to be moved to a different one of the weight-balance fixation positions 145. Alternatively, the repositionable weight 150 may have a button or aperture for pushing the ball 165 against the spring, which pushes the ball 165 out of the aligned aperture, freeing the repositionable weight 150 to move along the extension arm 130. In this way, when the fastener 160 is retracted the repositionable weight 150 is released to move along the balance track 140.

The fastener 160 is merely one type of fastener and other fasteners may be used. For example, a nut and bolt, screw, locking pin, or other fastener may be employed to removably secure the repositionable weight 150 in a select weight-balance fixation position. In addition, the fastener 160 may be a manually adjusted element, an electro-mechanical element controlled by a circuit or processor, or a combination thereof.

With the fastener 160 retracted, the repositionable weight 150 may be released from one of the plurality of weight-balance fixation positions 145 for repositioning to another (e.g., along the longitudinal axis 135 in FIG. 1A). The repositionable weight 150 may be configured to slide along the balance track 140 between the plurality of weight-balance fixation positions 145. Each of the repositionable weights 150 may be moveable toward or away from the central portion of the frame (e.g., 115) along the balance track 140. Internal surfaces of the repositionable weight 150 may be designed to have a low coefficient of friction in order to promote smooth movement along the balance track 140. Alternatively, the repositionable weight 150 and/or the balance track 140 may include rollers or ball bearings for reducing friction.

FIG. 2A is an isolated perspective view of a weight distribution apparatus 200 for adjusting a center of mass of a drone (e.g., 10 in FIG. 1A) according to various embodiments. With reference to FIGS. 1A-2A, in various embodiments, the weight distribution apparatus 200 may include a balance track 240 for holding a repositionable weight 250 in one or more of a plurality of weight-balance fixation positions. The balance track 240 may be attached to and disposed on one of the extension arms 130, which supports a single one of the air propulsion units 120 of a drone (e.g., 10). The balance track 240, as well as the extension arm 130, may extend laterally from the proximal end 131 adjacent the central region (e.g., 115) to the distal end 139 adjacent the air propulsion unit 120. In addition, the balance track 240 may be one of multiple such balance tracks, each extending laterally on separate extension arms 130.

The balance track 240 may be formed as a rail assembly with parallel guide elements 242 and crossbars 245. The repositionable weight 250 may ride along the parallel guide elements 242. In some embodiments, the repositionable weight 150 may be positioned anywhere along the balance track 240 providing an almost infinite number of weight-balance fixation positions. The repositionable weight 250 may be removably secured to the balance track 240 at a particular location by a locking pin or strap (not shown). Alternatively, a gear or wheel assembly of the repositionable weight 250 may be lockable in order to keep the repositionable weight 250 from changing positions along the balance track 240. Alternatively, a brake element (not shown) on the repositionable weight 250 may hold onto or engage the crossbars 245 that serve to define the weight-balance fixation positions. In this way, the repositionable weight 250 may be positioned anywhere along the balance track 240 to adjust the overall balance or center of gravity of the drone.

In some embodiments, the repositionable weight 250 may include an indicator 256 for providing an indication that the repositionable weight 250 should or should not be repositioned. For example, the indicator 256 may provide a visual indication that suggests a direction the repositionable weight 250 should be moved (e.g., an arrow pointing in a direction). Alternatively or additionally, the indicator 256 may provide an audible indication (i.e., sound). Another indicator, which may be similar to the indicator 256, may optionally be disposed on the balance track 240, the extension arm 130, and/or another component.

FIG. 2B is a cross-sectional view at cross-section 2B-2B in FIG. 2A, illustrating the balance track 240 on the extension arm 130, supporting the repositionable weight 250 according to an embodiment. With reference to FIGS. 1A-2B, in various embodiments, the repositionable weight 250 may include a rail-support assembly 252, such as an actuator, rail-wheels, or glide elements. In addition, the repositionable weight 250 may include a control unit 255 for controlling the movement or fixation of the repositionable weight 250 through the rail-support assembly 252. Optionally, the control unit 255 may include or be coupled to one or more radio frequency transceivers (e.g., Peanut, Bluetooth, Bluetooth LE, Zigbee, Wi-Fi, RF radio, etc.) and an onboard antenna 257 for sending and receiving communications, coupled to a processor (e.g., 320 in FIG. 3). For example, the onboard antenna 257 may receive control signals for activating and/or controlling the control unit 255. In addition or alternatively, the onboard antenna 257 may transmit status information about the repositionable weight 250 or other data, such as information collected by an onboard sensor. As a further alternative, the control unit 255 may output a signal to the indicator 256 or the like to indicate that the repositionable weight 250 should or should not be moved along the balance track 240.

FIG. 3 is a top view of the drone 10, with a schematic diagram of the control unit 255 and a remote communication device 300 according to various embodiments. With reference to FIGS. 1A-3, in various embodiments, the control unit 255 may be located in one or more of the repositionable weights (e.g., 150 in FIGS. 1A-1B or 250 in FIGS. 2A-2B) and/or another portion of the drone 10 (e.g., the central portion 115).

The control unit 255 may include a power module 310, the processor 320, and a radio frequency (RF) module 330. The processor 320 may include a memory 321 and sufficient processing power to conduct various control and computing operations for controlling the repositionable weights (e.g., 150, 250) and/or a component part thereof. The processor 320 may be powered from the power module 310, a power source outside the control unit 255, or a combination thereof. The processor 320 may be one or more multi-core integrated circuits designated for general or specific processing tasks. The memory 321 may be volatile or non-volatile memory, and may also be secure and/or encrypted memory, or unsecure and/or unencrypted memory, or any combination thereof. In other embodiments (not shown), the control unit 255 may also be coupled to an external memory, such as an external hard drive.

The processor 320 may communicate with the remote communication device 300 through the RF module 330. The onboard antenna 257 may be used to establish a wireless link 355 (e.g., a bi-directional or unidirectional link) to a remote antenna 357 of the remote communication device 300. The remote communication device 300 may be a device located elsewhere on the drone 10 (e.g., the central portion 115 or in another repositionable weight) or remote from the drone 10. The RF module 330 may support communications with multiple ones of the remote communication devices 300. While various components (e.g., the power module 310, the processor 320, or the RF module 330) of the control unit 255 are shown as separate components, in some embodiments, some or all of the components may be integrated together in a single device, chip, circuit board, or system-on-chip.

In some embodiments, the control unit 255 may be equipped with an input module 340, which may be used for a variety of applications. For example, the input module 340 may receive images or data from an onboard camera or sensor, or may receive electronic signals from other components (e.g., the payload 50). The input module 340 may receive an activation signal for causing actuators on the drone (e.g., activating the motor assembly 567 in FIG. 5B)

to reposition the repositionable weight (e.g., 150 in FIGS. 1A-1B or 250 in FIGS. 2A-2B). In addition, the control unit 255 may include an output module 345. The output module 345 may be used to activate components (e.g., an energy cell, an actuator, an indicator, a circuit element, a sensor, and/or a camera) that are configured to be used as the repositionable weight and/or transfer data. Components activated by the output module 345 may be configured to be used as the repositionable weight, be disposed elsewhere on the drone 10, or disposed remote from the drone 10. For example, the output module 345 may control the rail-support assembly (e.g., 252 in FIG. 2B) for controlling the movement or fixation of the repositionable weight. In this way, one or more components may be configured to be repositionable so a mass of each component may be used to balance the drone 10.

In various embodiments, the drone 10 may be configured to automatically adjust a weight distribution. For example, the control unit 255, through the input module 340, may receive an input indicating the drone 10 is out-of-balance. The input may include sufficient information for the processor 320 to determine a weight-distribution profile and/or whether to reposition a repositionable weight. In addition, the processor 320 may determine where to reposition the repositionable weight in order to initially balance or restore balance to the drone 10, such as when a payload has been added, removed, and/or moved. In response to determining that the repositionable weight should be repositioned, the processor 320 may output a weight-adjustment signal, such as through output module 345 for adjusting the weight distribution. For example, the weight-adjustment signal may cause motors to move one or more repositionable weights. In addition, the drone 10 may include multiple ones of the processor 320, each controlling a separate repositionable weight, but working together to balance the drone 10.

In various embodiments, the control unit 255 may receive remote instructions, such as through the RF module 330, for dynamically adjusting the weight distribution. For example, the remote communication device may transmit instructions to or otherwise communicate with the control unit 255. In this way, the remote communication device 300 may include or be coupled to a remote processor 302 configured to determine the weight-distribution profile and/or whether the repositionable weight should be repositioned. For example, the remote communication device 300 may be a computing device (e.g., cellular telephones, smart phones, laptop computers, tablet computers, smart books, palm-top computers, personal or mobile multi-media players, personal data assistants (PDA's), and similar electronic devices, etc.) and/or be coupled a remote computing device including another remote processor. In response to determining that the repositionable weight should be repositioned, the remote processor 302 may output a signal that may be transmitted, such as via the wireless link 355, to the processor 320 onboard the drone 10. This signal may cause the processor 320 onboard the drone 10 to output a weight-adjustment signal, such as through an output module 345, for adjusting the weight distribution. In addition, the drone 10 may include multiple ones of the control unit 255, each controlling a separate repositionable weight, but working together to balance the drone 10. Alternatively, the remote processor 302 and the processor 320 onboard the drone 10 may share in making determinations, such as those described.

FIG. 4 is a cross-sectional view, similar to the view shown in FIG. 2B, illustrating a weight distribution apparatus 400 for adjusting a center of mass of a drone (e.g., 10 in FIGS. 1A and 3) according to various embodiments. With reference to FIGS. 1A-4, in various embodiments, the weight distribution apparatus 400 may include a repositionable weight 450, including side brackets 452 for guiding and maintaining the repositionable weight 450 on the balance track 440. The balance track 440 may be one of multiple such balance tracks, each extending laterally on separate extension arms 130 (e.g., see FIGS. 1A and 3).

FIG. 5A is a perspective view of a weight distribution apparatus 500 for adjusting a center of mass of a drone (e.g., 10 in FIGS. 1A and 3) according to various embodiments. With reference to FIGS. 1A-5A, in various embodiments, the weight distribution apparatus 500 may include a balance track 540 for holding a repositionable weight 550 in one or more of a plurality of weight-balance fixation positions 545. The balance track 540 may be included as part of, attached to, or disposed on one of the extension arms 130, which supports a single one of the air propulsion units 120 of a drone (e.g., 10 in FIG. 1A). The balance track 540, as well as the extension arm 130, may extend laterally from the central region (e.g., 115 in FIG. 1A) of the drone toward the air propulsion unit 120. The balance track 540 may be one of multiple such balance tracks, each extending laterally on separate extension arms 130 (e.g., see FIGS. 1A and 3).

The repositionable weight 550 may be or include an electronic component 570 of the drone. In this way, the repositionable weight 550 may be configured to perform functions in addition to adjusting the center of mass of the drone. For example, the electronic component 570 may include a camera, a sensor, an actuator, an indicator, and/or an energy cell. In addition, the electronic component 570 may supply power, such as in the case of the electronic component 570 being an energy cell, and/or draw power, such as in the case of the electronic component 570 being a camera, sensor, actuator, or indicator. As a power supply, a conductive strip 575 may couple the electronic component 570 to other components of the drone. The conductive strip 575 may extend along the balance track 540 so that the repositionable weight 550 may remain coupled to the conductive strip 575 in any of the plurality of weight-balance fixation positions 545. In this way, remote elements such as the air propulsion unit 120 or other components may receive power from the electronic component 570 via the conductive strip 575. Alternatively or additionally, the conductive strip 575 may supply power to the electronic component 570. In this way, the conductive strip 575 may power, partially or exclusively, the electronic component 570.

FIG. 5B is a cross-sectional view at cross-section 5B-5B in FIG. 5A, illustrating the balance track 540 on the extension arm 130, supporting the repositionable weight 550 according to an embodiment. With reference to FIGS. 1A-5B, in some embodiments, the repositionable weight 550 may include an actuator, such as a motor assembly 567 and an advancement mechanism 565, for removably securing the repositionable weight 550 to the balance track 540 and/or repositioning the repositionable weight 550 along the balance track 540. The motor assembly 567 may control the advancement mechanism 565 for moving the repositionable weight 550 or holding in-place the repositionable weight 550 at a particular one of the plurality of weight-balance fixation positions 545. The advancement mechanism 565 may include a moveable arm, pins, or gears configured to grab hold of the extension arm 130 or balance track 140 for movement. For example, the advancement mechanism 565 may move while leveraging an edge of the apertures forming the plurality of weight-balance fixation positions 545 for movement. Similarly, the advancement mechanism 565 may lock and thus hold the repositionable weight 550 in a particular position. In this way, the motor assembly 567 may slide the repositionable weight 550 along the balance track 540. Alternatively, from a locked configuration, the advancement mechanism 565 may be actuated in a way that releases the repositionable weight 550 from being held in the particular one of the plurality of weight-balance fixation positions 545 for manual repositioning or movement by other means.

The motor assembly 567 and/or any other electronic component on the repositionable weight 550 (e.g., the electronic component 570 in FIG. 5A) may be activated manually and/or activated by a controller (e.g., the control unit 255 in FIG. 2B). In addition, the activation of the motor assembly 567 or any other electronic component may be from a switch or controller that is located either locally on the repositionable weight 550 or remotely. For example, a local switch may include a button on the repositionable weight 550 for activating the motor assembly 567. Similarly, located on or in the repositionable weight 550, the control unit (e.g., 255 in FIG. 2B) with a processor may be configured with processor-executable instructions to perform operations, such as causing the motor assembly 567 to reposition the repositionable weight 550. Further, the control unit may receive input from a remote source elsewhere on the drone or through wireless communications (e.g., via the onboard antenna 257 in FIG. 2B) remote from the drone. In some embodiments, a switch or the control unit located elsewhere on the drone (e.g., the central portion 115 in FIG. 1A) may activate the motor assembly 567, such as by directing power thereto (e.g., via the conductive strip 575 in FIG. 5A).

FIG. 6A is a perspective view of a weight distribution apparatus 600 for adjusting a center of mass of a drone (e.g., 10 in FIGS. 1A and 3) according to various embodiments. With reference to FIGS. 1A-6A, in various embodiments, the weight distribution apparatus 600 may include a balance track 640 for holding one or more repositionable weights 650 in one or more of a plurality of weight-balance fixation positions 645. The balance track 640 may be part of, attached to, or disposed on one of the extension arms 130 that supports a single one of the air propulsion units 120 of a drone (e.g., 10 in FIGS. 1A and 3). The balance track 640, as well as the extension arm 130, may extend laterally from the central region (e.g., 115 in FIG. 1A) of the drone toward the air propulsion unit 120. The balance track 640 may be one of multiple such balance tracks, each extending laterally on separate extension arms 130 (e.g., see FIGS. 1A and 3).

In various embodiments, the repositionable weights 650 may be removably secured to at least one of the weight-balance fixation positions 645. For example, one of the repositionable weights 650 is shown secured in a first position (indicated by the arrow extending from a circle labeled "1"). The first position may be selected for the one of the repositionable weights 650 to balance the drone based on a particular payload configuration. The one of the repositionable weights 650 may be repositioned to a second position (indicated by the arrow extending from a circle labeled "2"). In the second position, the one of the repositionable weights 650 moves the center of mass of the overall drone away from the central portion (e.g., 115 in FIGS. 1A and 3) and toward a distal end 139 of the extension arm 130. The plurality of weight-balance fixation positions 645 may be evenly distributed along a longitudinal extent of the balance track 640 for providing a linear adjustment when moving one of the repositionable weights 650. Alternatively, the plurality of weight-balance fixation positions 645 may have an uneven distribution, such as an increasing or decreasing spacing along the longitudinal extent of the balance track 640. In addition, the balance track 640 may be one of multiple such balance tracks, each extending laterally on separate extension arms 130 (e.g., see FIGS. 1A and 3).

In various embodiments, the repositionable weights 650 may each include an energy cell. In this way, an onboard power source may double as part of the weight distribution apparatus 600. The conductive strip 575 (similar to that described with reference to FIGS. 5A and 5B) may extend along the balance track 640 so that the repositionable weights 650 may be electrically coupled to the conductive strip 575 in any of the plurality of weight-balance fixation positions 645.

FIG. 6B is a cross-sectional view at cross-section 6B-6B in FIG. 6A, illustrating the balance track 640 on the extension arm 130, supporting one of the plurality of repositionable weights 650 according to some embodiments. With reference to FIGS. 1A-6B, the repositionable weights 650 may include a fastening mechanism 655 for removably securing each one of the plurality of repositionable weights 650 to the balance track 640. The fastening mechanism 655 may extend through an aperture forming a particular one of the plurality of weight-balance fixation positions (labeled as "645"). This may allow the fastening mechanism 655 to reach through the extension arm 130 and engage a back-plate element 651 designed to receive and hold the fastening mechanism 655 once secured therein. The back-plate element 651 may include a recess for matingly receiving and holding the fastening mechanism 655 therein. For example, the fastening mechanism 655 may include a threaded shaft that matches a threaded recess or aperture in the back-plate element 651. A variation of the back-plate element 651 may include a nut and washer arrangement that mates to a threaded shaft of the fastening mechanism 655. Alternatively, the fastening mechanism 655 and the back-plate element 651 may include magnetic elements for holding together the fastening mechanism and the back-plate element 651. In addition, the back-plate element 651 may be configured in more than one size or weight so that the back-plate element 651 may add to the weight of the repositionable weights 650.

Figure 7:
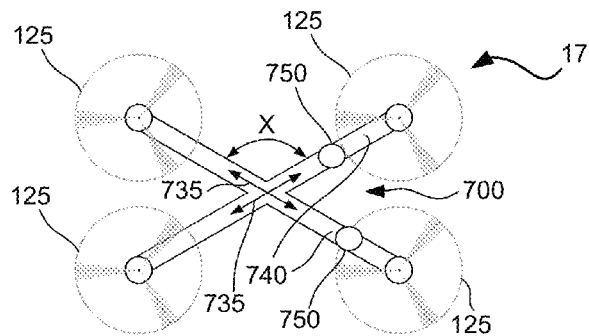
FIG. 7 is a top view of a quad-copter drone with extension arms intersecting non-orthogonally according to various embodiments.

FIG. 7 is a top view of a drone 17 that includes a weight distribution apparatus 700 for adjusting a center of mass according to various embodiments. In various embodiments, the drone 17 and/or components thereof may generally correspond to the drone 10 (e.g., FIGS. 1A and 3). With reference to FIGS. 1A-7, the weight distribution apparatus 700 may include balance tracks 740 extending laterally from a central region of the drone 17. The balance track 740 may be configured to receive a repositionable weight 750 for adjusting the center of mass of the drone 17. The drone 17 may include four propellers 125 (i.e., a quad-copter) driven by air propulsion units (e.g., 120 in FIG. 1A). Extension arms supporting the propellers 125 may form the balance tracks 740 (e.g., 130 in FIGS. 1A-2B and 4-6B). The balance tracks 740 include a plurality of weight-balance fixation positions distributed continuously along an axis 735 common to and extending longitudinally across two opposed extension arms. Marks, stops, apertures, or other demarcations in or on the balance tracks 740 may establish particular ones of the plurality of weight-balance fixation position. In such embodiments, a repositionable weight 750 may be repositionable (e.g., by sliding or being removed and re-secured in another position) along the balance track 740 from one extension arm (e.g., one of the extension arms on the right side of FIG. 7) to the opposed extension arm (e.g., one of the other extension arms on the left side of FIG. 7) along the axis 735.

Two of the axes 735 may intersect at a non-orthogonal angle X. The non-orthogonal angle X may be larger or smaller as appropriate for aerodynamics, payload configuration, or other considerations. In alternative embodiments, the extension arms forming the balance tracks 740 may change shape or be moveable. For example, the extension arms forming the balance tracks 740 may retract or extend in order to shorten or lengthen the balance tracks 740, and thus change the position of one or more of the repositionable weights 750. As a further example, the extension arms forming the balance tracks 740 may pivot, changing the non-orthogonal angle X. The drone may be configured to operate in a first flight mode in which the balance tracks 740 are set to a first length and/or a first angle, and in a second flight mode in which the balance tracks 740 are set to a second length and/or a second angle.

Figure 8:
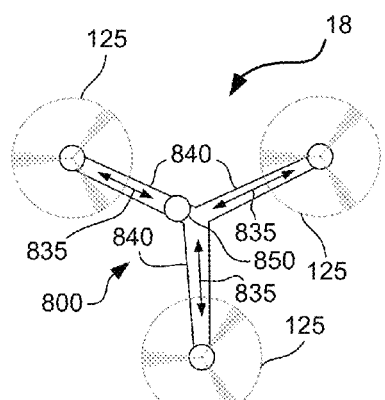
FIG. 8 is a top view of a tri-copter drone with extension arms according to various embodiments.

FIG. 8 is a top view of a three-rotor drone 18 that includes a weight distribution apparatus 800 for adjusting a center of mass according to various embodiments. In various embodiments, the drone 18 and/or components thereof may generally correspond to the drone 10 (e.g., FIGS. 1A and 3). With reference to FIGS. 1A-8, the weight distribution apparatus 800 may include three balance tracks 840 extending laterally from a central region of the drone 18. Each of the balance tracks 840 extend in a different direction. The balance track 840 may be configured to receive a repositionable weight 850 for adjusting the center of mass. The drone 18 may include three propellers 125 (i.e., a tri-copter) driven by air propulsion units (e.g., 120 in FIG. 1A). Extension arms supporting the propellers 125 may form the balance tracks 840 (e.g., 130 in FIGS. 1A-2B and 4-6B). The three balance tracks 840 may include a plurality of weight-balance fixation positions distributed along an axis 835 extending longitudinally along each extension arm. The repositionable weight 850 is repositionable (e.g., by sliding or being removed and re-secured in another position) along any one of the three balance tracks 840, moving to the central region in order to change from one of the balance tracks 840 to another one of the balance tracks 840.

Figure 9:
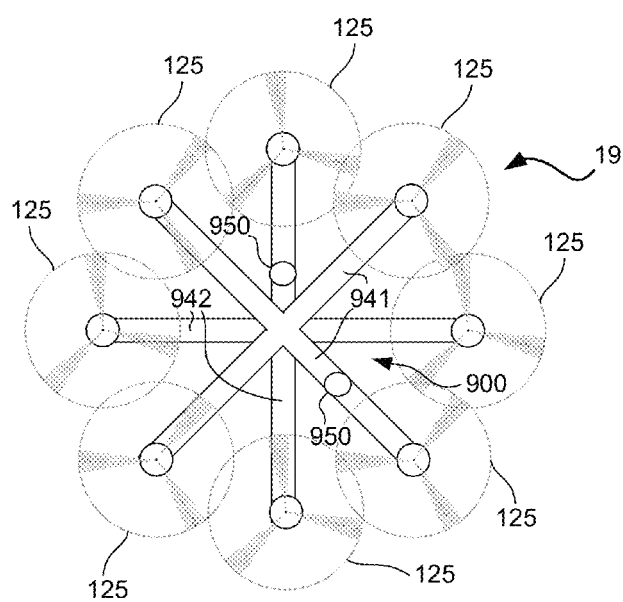
FIG. 9 is a top view of an octo-copter drone with extension arms according to various embodiments.

FIG. 9 is a top view of an eight-rotor drone 19 that includes a weight distribution apparatus 900 for adjusting a center of mass according to various embodiments. In various embodiments, the drone 19 and/or components thereof may generally correspond to the drone 10 (e.g., FIGS. 1A and 3). With reference to FIGS. 1A-9, the weight distribution apparatus 900 may include two sets of four balance tracks 941, 942 extending laterally from a central region of the drone 19. The two sets of four balance tracks 941, 942 may be configured to receive a repositionable weight 950 for adjusting the center of mass. The drone 19 may include eight propellers 125 (i.e., an octo-copter) driven by air propulsion units (e.g., 120 in FIG. 1A). Extension arms supporting the propellers 125 may form the two sets of four balance tracks 941, 942 (e.g., 130 in FIGS. 1A-2B and 4-6B). The eight propellers 125 may be divided into two groups corresponding to the two sets of four balance tracks 941, 942, with each group at a different height so the propellers 125 do not collide. The two sets of four balance tracks 941, 942 include a plurality of weight-balance fixation positions distributed continuously along an axis extending longitudinally along each extension arm. The repositionable weight 950 may be repositionable (e.g., by sliding or being removed and re-secured in another position) along any one of the two sets of four balance tracks 941, 942.

Figure 10:
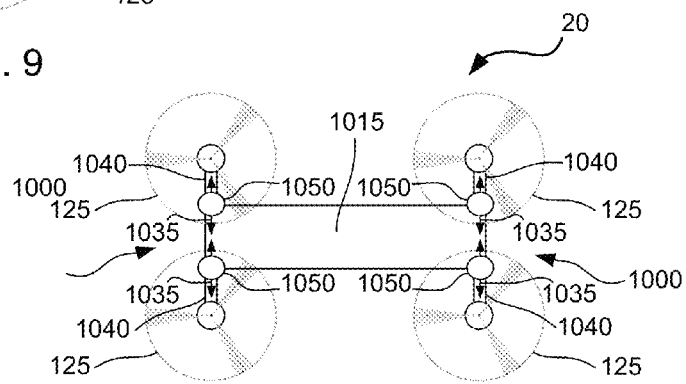
FIG. 10 is a top view of an H-frame quad-copter drone with extension arms extending parallel to one another according to various embodiments.

FIG. 10 is a top view of another configuration of a quad-rotor drone 20 that includes a weight distribution apparatus 1000 for adjusting a center of mass according to various embodiments. In various embodiments, the drone 20 and/or components thereof may generally correspond to the drone 10 (e.g., FIGS. 1A and 3). With reference to FIGS. 1A-10, the weight distribution apparatus 1000 may include balance tracks 1040 extending laterally from a central region 1015 of the drone 20. The balance track 1040 may be configured to receive a repositionable weight 1050 for adjusting the center of mass. The drone 20 may include four propellers 125 (i.e., a quad-copter) driven by air propulsion units (e.g., 120 in FIG. 1A). Extension arms supporting the propellers 125 may form the balance tracks 1040 (e.g., 130 in FIGS. 1A-2B and 4-6B). Pairs of the balance tracks 1040 extend away from one another and the central region 1015 of the drone 20 along an axis 1035 common to both balance tracks 1040. In addition, the balance tracks 1040 form an H-frame structure. In this way, a first pair of the balance tracks 1040 along with a corresponding first pair of the axis 1035 (e.g., on the right side in FIG. 10) extend parallel to a second pair of the balance tracks 1040 and a corresponding second pair of the axis 1035 (e.g., on the left side in FIG. 10). The balance tracks 1040 include a plurality of weight-balance fixation positions distributed continuously along each of the axes 1035. In this way, the repositionable weight 1050 may be repositionable (e.g., by sliding or being removed and re-secured in another position) along the balance track 1040.

With reference to FIGS. 1A-10, in various embodiments the repositionable weights (e.g., 150, 250, 450, 550, 650, 750, 850, 950, 1050) may be fluid weights formed by a fluid or semi-solid substance that can be pumped or redistributed within a piping system in order to adjust the center of gravity of the drone. In such embodiments, the balance tracks may be in the form of tubing or an inner conduit for conveying the fluid about the frame. A pump (not shown) may move (i.e., reposition) some or all of the fluid in order to redistribute weight along a particular balance track. For example, the pump may be configured to push the fluid toward an inner part of the balance track, an outer part of the balance track, somewhere in-between, or evenly distributed across the extent of the balance track. Each balance track may have a separate pump or multiple balance tracks may share a pump. A semi-solid substance may include a liquid or gas and numerous solid elements, such as pellets or ball bearings, contained within. For example, a distribution of ball bearings may be changed using pressurized air. Alternatively, the repositionable weights may include such numerous small solid elements (e.g., ball bearings) that are moved with magnetic forces or mechanical elements.

Figure 11:
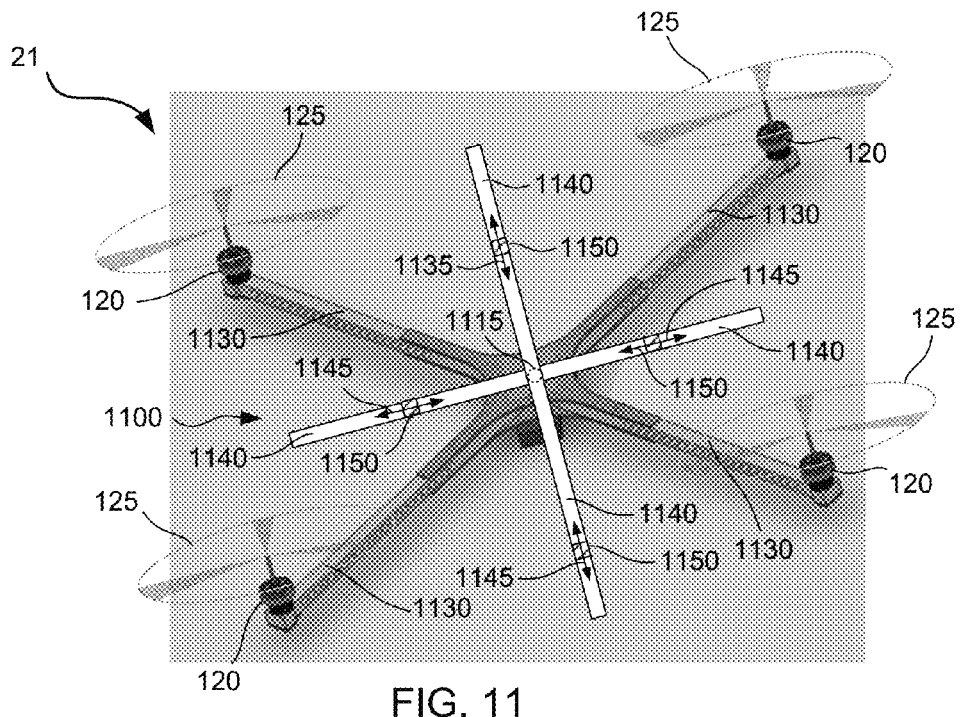
FIG. 11 is a perspective view of a drone including balancing tracks for a weight distribution apparatus offset from propulsion-unit extension arms according to various embodiments.

FIG. 11 is a perspective view of a drone 21 that includes a weight distribution apparatus 1100 for adjusting a center of mass according to various embodiments. In various embodiments, the drone 21 and/or components thereof may generally correspond to the drone 10 (e.g., FIGS. 1A and 3). With reference to FIGS. 1A-11, in various embodiments, the weight distribution apparatus 1100 may include extension arms 1130 that are separate from balance tracks 1140. The balance tracks 1140 extend laterally from a central region 1115 of the drone 21. The balance tracks 1140 may be configured to receive a repositionable weight 1150 for adjusting the center of mass. The drone 21 may include four propellers 125 (i.e., a quad-copter) driven by air propulsion units (e.g., 120 in FIG. 1A). The extension arms 1130 support the propellers 125. The balance tracks 1140 also include a plurality of weight-balance fixation positions distributed continuously along each axis 1145 common to and extending longitudinally across two opposed extension arms. One or more of the repositionable weights 1150 may be removably secured along one or more of the balance tracks 1140. Each of the repositionable weights 1150 may be disposed a different distance from the central region 1115 of the drone 21 in order to achieve a desired balance adjustment. As an optional alternative, the balance tracks 1140 may be configured to rotate about a vertical central axis or central region 1115 of the drone 21 ("up" or "down" relative to the perspective view in FIG. 11).

Figure 12:
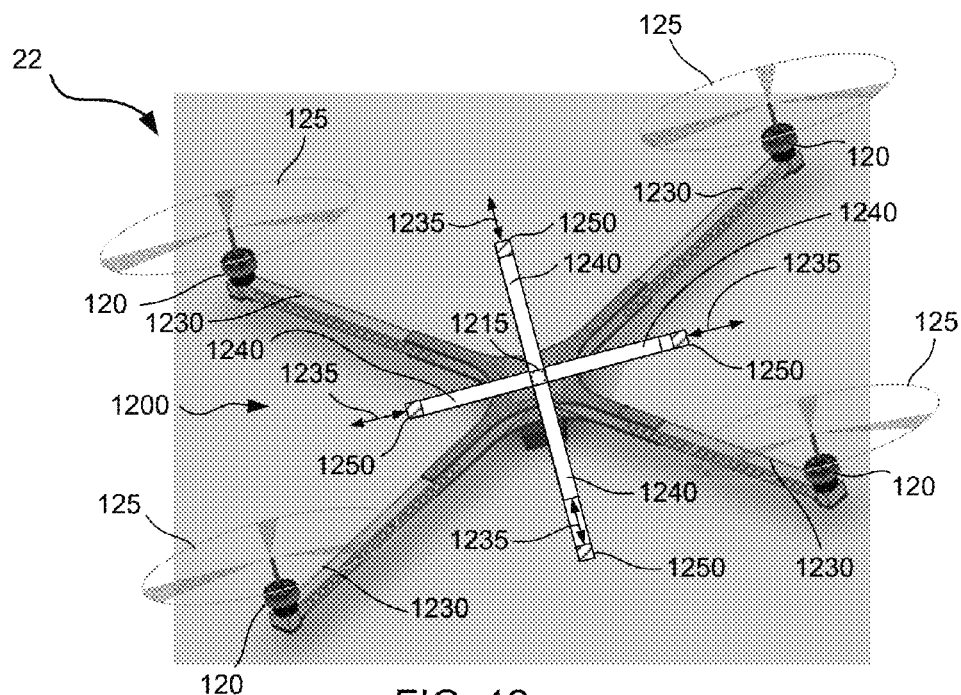
FIG. 12 is a perspective view of a drone including retractable/extendable balance tracks according to various embodiments.

FIG. 12 is a perspective view of a drone 22 that includes a weight distribution apparatus 1200 for adjusting a center of mass according to various embodiments. In various embodiments, the drone 22 and/or components thereof may generally correspond to the drone 10 (e.g., FIGS. 1A and 3). With reference to FIGS. 1A-12, in such embodiments, the weight distribution apparatus 1200 may include balance tracks 1240 extending laterally from a central region 1215 of the drone 21. The balance tracks 1240 may be configured to receive a repositionable weight 1250 for adjusting the center of mass. In addition, the balance tracks 1240 may change length (i.e., retract or extend) for repositioning the repositionable weight 1250. The drone 21 may include four propellers 125 driven by air propulsion units (e.g., 120 in FIG. 1A). Extension arms 1230 supporting the propellers 125 are separate from the balance tracks 1240. The balance tracks 1240 include a plurality of weight-balance fixation positions corresponding to different lengths of the balance tracks 1240, which may be changed. In this embodiment, the length of each balance track 1240, along an axis 1245 extending away from the central region 1215, may be shortened or lengthened in order to change the position of the repositionable weight 1250. Each of the repositionable weights 1250 may be retracted or extended to a different relative distance from the central region 1215 of the drone 21 in order to achieve a desired balance adjustment. As an optional alternative, the balance tracks 1240 may be configured to rotate about a vertical central axis or central region 1215 of the drone 21 ("up" or "down" relative to the perspective view in FIG. 12).

Figure 13A:
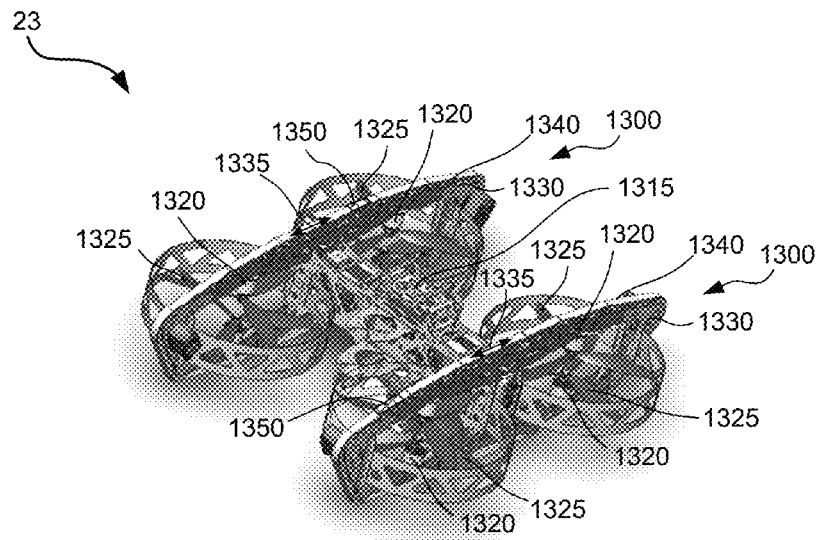
FIG. 13A is a perspective view of a drone including rotating balancing tracks according to various embodiments.
Figure 13B:
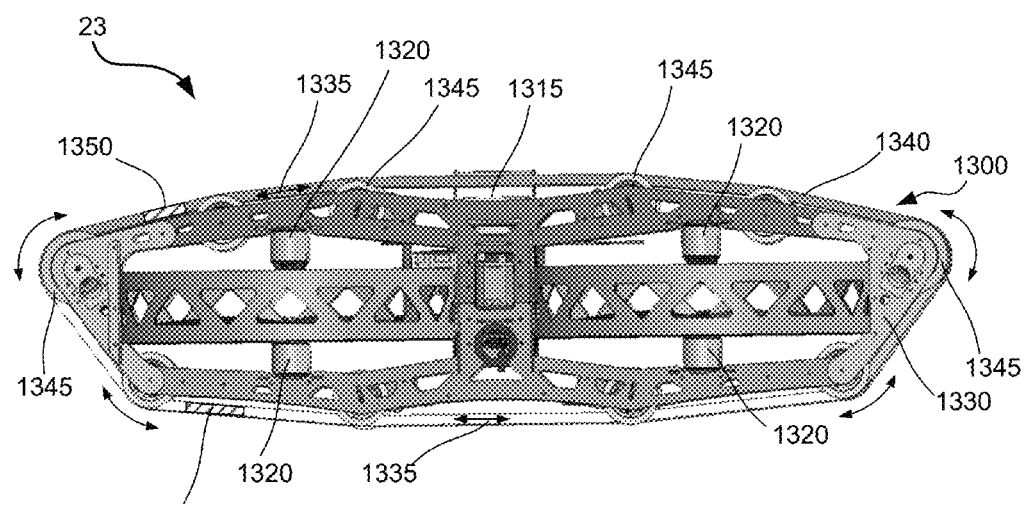
FIG. 13B is a side view of the drone in FIG. 13A according to various embodiments.

FIG. 13A is a perspective view of a drone 23 that includes a weight distribution apparatus 1300 for adjusting a center of mass according to various embodiments. FIG. 13B is a side view of the drone in FIG. 13A. In various embodiments, the drone 23 and/or components thereof may generally correspond to the drone 10 (e.g., FIGS. 1A and 3). With reference to FIGS. 1A-13B, in various embodiments, the weight distribution apparatus 1300 may include balance tracks 1340 extending laterally from a central region 1315 of the drone 23. The balance track 1340 may be configured to receive a repositionable weight 1350 for adjusting the center of mass. The drone 23 may include eight propellers 1325 (i.e., an octo-copter) driven by air propulsion units 1320. Extension arms 1330 form an oblong frame structure supporting the propellers 1325 on an inside of the frame structure and the balance tracks 1340 along the outside of the frame structure. The balance tracks 1340 extend away from the central region 1315 and form an H-frame structure in this embodiment, with a first one of the balance tracks 1340 (e.g., on the top left in FIG. 13A) extending parallel to a second one of the balance tracks 1340 (e.g., on the bottom right in FIG. 13A).

The balance tracks 1340 may be formed as a loop that may be continuous, segmented with gaps, or linked together like chain links. In addition, the balance tracks 1340 may form a thick flat band, a more bulky tread (e.g., a tank tread), a combination thereof, or another form. The balance tracks 1340 may be configured to circulate around the extension arms 1330, which changes a position of one or more of the repositionable weights 1350. One or more rotational supports 1345 (see FIG. 13B) may be motorized for rotating the balance track 1340 supported thereon. In addition, an onboard processor (e.g., located in the central region 1315) may control the motorized rotation of the rotational supports 1345. In this embodiment, the processor may control the rotation of each of the balance tracks 1340 to change one or more of the repositionable weights 1350 into a different one the plurality of weight-balance fixation positions for balancing the drone 23.

The repositionable weights 1350 may be removably secured to a surface of the balance track 1340 (e.g., facing outwardly or facing the rotational supports 1345), such as with a fastening mechanism (e.g., 655 in FIG. 6). This enables a position of the repositionable weight 1350 on the balance track 1340 to be changed or one or more repositionable weights 1350 removed (e.g., dropped) or added. Alternatively, the repositionable weights 1350 may be embedded in the balance track 1340, such as between layers.

Optionally, movement of the drone 23 when landed may be provided using the balance tracks 1340 like tank treads. In such embodiments, the balance tracks 1340 may provide direct engagement with a surface, like the ground or a wall, for movement there along. When used for ground movement, the rotation of the balance tracks 1340 may leave the repositionable weights 1350 in an unbalanced position. Thus, prior to or after lift-off, the processor may activate one or more actuators to move the repositionable weights 1350 into a more desirable one of the plurality of weight-balance positions to achieve a desired balance adjustment. In addition, the repositioning of the repositionable weights 1350 for repositioning the center of mass of the drone 23 may be performed in stages. For example, a preliminary adjustment may be performed before lift-off and a secondary adjustment may be performed after lift-off.

Figure 14A:
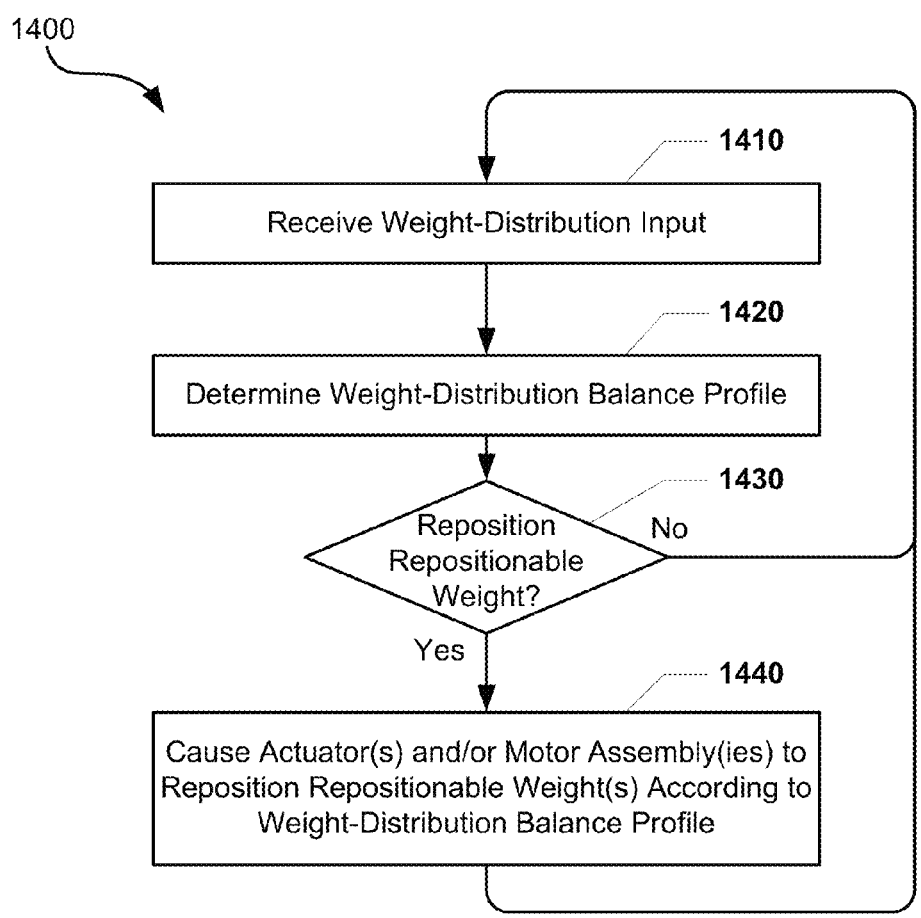
FIG. 14A is a process flow diagram illustrating an embodiment method for adjusting a center of mass of a drone according to various embodiments.

FIG. 14A illustrates a method 1400 for adjusting a center of mass of a drone (e.g., 10 in FIGS. 1A and 3 and 17-23 in FIGS. 7-13B) using a weight distribution apparatus (e.g., 100, 200, 400, 500, 600, 700, 800, 900, 1000, 1100, 1200, 1300 in FIGS. 1-13B) according to various embodiments. With reference to FIGS. 1-14A, operations of the method 1400 may be performed by a drone control unit (e.g., 255 in FIGS. 2B and 3) or other computing device, and one or more actuators (e.g., motor assembly 567 in FIG. 5B) for changing the weight-balance fixation position of one or more repositionable weights (e.g., 550 in FIGS. 5A and 5B).

In block 1410, the processor (e.g., the processor 320 in the control unit 255 or processor 302 in the remote communication device 300) may receive a weight-distribution input (e.g., via the bi-directional wireless link 355) relating to balancing the drone. The weight-distribution input may be received from a remote source, such as through wireless communications (e.g., via an onboard antenna 257), from an onboard sensor (e.g., via input module 340), from onboard components (e.g., via the input module 340 using the same or a different input port as the onboard sensor), or manually from a user or operator of the drone. For example, the weight-distribution input may be an activation signal sent from the operator (e.g., through a remote user interface on the remote communication device 300 or through a user interface on the drone). The weight-distribution input may include raw data, such as one or more values corresponding to rotational forces in a pitch, yaw, or roll direction from existing imbalances. Alternatively, the weight-distribution input may include processed data indicating one of the plurality of weight-balance fixation positions at which one or more of the repositionable weights should be in order to achieve a desired balance adjustment for the drone, such as based on current payload positions. As a further alternative, the weight-distribution input may include a combination of raw and processed data.

The processor may receive the weight-distribution input in response to an initial or changed weight-distribution balance profile for the drone. In addition, changes to the weight-distribution balance profile that generate a new weight-distribution input may result from the release, addition, or repositioning of payloads. In this way, the weight-distribution input may be received before the drone takes flight, during a flight from one location to another (e.g., a mid-air drop-off/pick-up of payload), after landing but before a subsequent flight, or other suitable time. Alternatively, the processor may receive the weight-distribution input during flight (e.g., just after take-off) in order to make refinements or any needed adjustments to the weight-distribution balance profile under real flight conditions (i.e., an active system making dynamic adjustments). Mid-air adjustments may be used not only to adjust for weight of an added or released payload, but may also adjust for changes in aerodynamic profile, shifting of payload or payload contents, consumption of fuel during the flight, and/or changing external forces, such as turbulence (e.g., attitude adjustment as part of flight control) or weather conditions (e.g., precipitation, wind, etc.). In this way, the processor may provide an active system that continually makes adjustments for weight and balance as needed.

In block 1420, a processor (e.g., processor 320 in the control unit 255 or processor 302 in the remote communication device 300) may determine a weight-distribution balance profile for the drone. The processor may determine the weight-distribution balance profile at any time, including before the drone lifts-off, after lift-off, mid-fight, or after landing. The weight-distribution balance profile may include appropriate balance adjustments needed to balance the airframe in view of the received weight-distribution input. For example, the processor may access a memory (e.g., memory 321) in which the current positions of any repositionable weights are stored. In addition, based on the weight-distribution input received in block 1410, the processor may determine in which one(s) of the plurality of weight-balance fixation positions one or more repositionable weights should be positioned in order to achieve the desired balance adjustment for the drone. For example, received raw data may reflect a rotational force imbalance in one or more of pitch, yaw, or roll rotational directions. Based on the rotational force imbalance, the processor may determine how the repositionable weights should be positioned in order to achieve balance and eliminate the rotational force imbalance. Thus, comparing the current weight-balance fixation positions to the weight-balance fixation positions needed for balance, the processor may determine whether any of the repositionable weights need to be moved to balance the drone. In addition, the processor may determine the activation signals needed to activate an actuator to move one or more of the repositionable weights to the appropriate positions for achieving the desired balance adjustment. Alternatively, the processor may receive manual controls, from an operator, that include or translate into the activation signals.

In determination block 1430, the processor may determine whether any of the repositionable weights should be repositioned in order to implement the weight-distribution balance profile to achieve the desired balance adjustment for the drone. In response to determining that at least one of the repositionable weights needs to be repositioned in order to implement the weight-distribution balance profile (i.e., determination block 1430="Yes"), the processor may cause an actuator to reposition at least one of the repositionable weights in block 1440. Repositioning the repositionable weight may include moving the repositionable weight along a balance track, changing a length of a balance track, and/or rotating the balance track as described. Alternatively, repositioning the repositionable weight may include releasing the repositionable weight for removal (e.g., activating an actuator allowing the repositionable weight to be removed or separate from the drone, such as dropping to the ground). In response to determining that none of the repositionable weights needs to be repositioned in order to implement the weight-distribution balance profile (i.e., determination block 1430="No"), the control unit may repeat the operations of the method 1400, waiting to receive further weight-distribution inputs in block 1410.

In block 1440, the processor may cause one or more actuators to reposition one or more repositionable weights according to the weight-distribution balance profile. For example, the processor may cause an actuator (e.g., motor assembly 567) to move or release a repositionable weight (e.g., 150, 250, 450, 550, 650, 750, 850, 950, 1050, 1150, 1250, 1350). In various embodiments, the actuator may move the repositionable weight along a balance track (e.g., 140, 240, 440, 540, 640, 740, 840, 941, 942, 1040, 1140, 1240, 1340), change a length of the balance track, and/or rotate the balance track to reposition the repositionable weight. The processor may achieve a desired new position for the repositionable weight by activating the actuator(s) (e.g., motor assembly 567) for a determined time sufficient to reach the desired new position. Alternatively, the processor may start the actuator(s) and await sensor feedback indicating the repositionable weight has reached the desired new position or that the drone is now balanced. As a further alternative, the start and stop of actuators may be controlled remotely (e.g., through wireless communications). For example, after the processor causes the actuator to start moving, following receipt of remote instructions to do so, the processor may await further remote instructions to stop movement caused by the actuator. The control unit may repeat the operations of the method 1400 following the trigger of the actuator(s) in block 1440, receiving further weight-distribution inputs in block 1410.

Figure 14B:
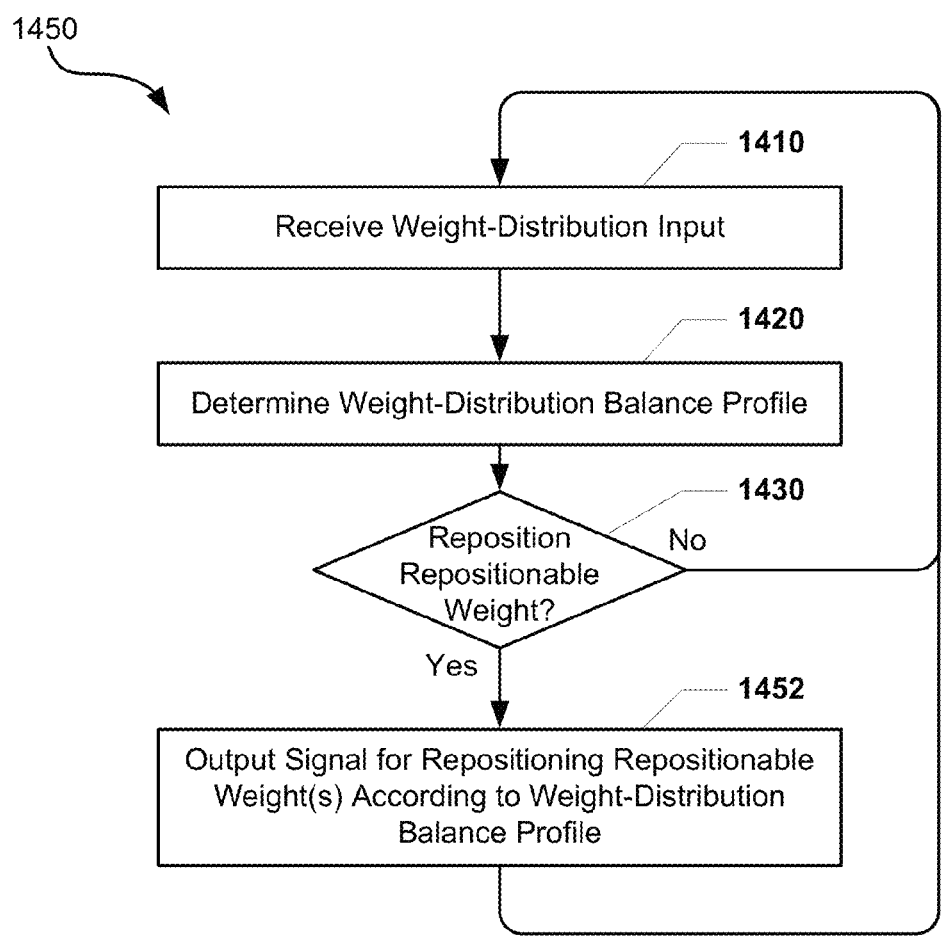
FIG. 14B is a process flow diagram illustrating another embodiment method for adjusting a center of mass of a drone according to various embodiments.

FIG. 14B illustrates an alternative method 1450 for adjusting a center of mass of a drone (e.g., 10 in FIGS. 1A and 3 and 17-23 in FIGS. 7-13B) using a weight distribution apparatus (e.g., 100, 200, 400, 500, 600, 700, 800, 900, 1000, 1100, 1200, 1300 in FIGS. 1-13B) according to various embodiments. With reference to FIGS. 1-14A, operations of the method 1450 may be performed by a drone control unit (e.g., 255 in FIGS. 2B and 3) or other computing device, and one or more actuators (e.g., motor assembly 567 in FIG. 5B) for changing the weight-balance fixation position of one or more repositionable weights (e.g., 550 in FIGS. 5A and 5B).

In the method 1450, the processor (e.g., processor 320 in the control unit 255 or processor 302 in the remote communication device 300) may perform the operations of blocks 1410-1430 as described for like numbered blocks of the method 1400. In block 1452, the processor may output a signal for repositioning the repositionable weight(s) according to weight-distribution balance profile. The output signal may cause an actuator to operate as described with regard to the method 1450, or communicate information to another processor or device (onboard and/or remote from the drone). Information communicated by the output signal may be stored (e.g., in memory) and/or used immediately. For example, an output signal may cause an indicator to indicate that a repositionable weight should be repositioned. The indicator may provide a visual indication (e.g., a diode that lights or a display screen presenting information), an audible indication (e.g., a sound or audible instructions), vibrations, and/or another indication. Indications provided by the indicator may be relatively simple, such as by having a light turn on or off, or provided by sounding an alarm. Indications provided by the indicator may alternatively or additionally provide more detailed information, such as information that may inform an operator about how to reposition the weight(s) according to weight-distribution balance profile. For example, the indicator may indicate that a repositionable weight should be moved, added, or removed. Similarly, the indicator may indicate that a length of a balance track should be changed and/or the balance track rotated. In embodiments in which information is sent in a data signal to another processor, the data signal may include information for the other processor to cause the indicator to inform or to otherwise instruct an operator about how to reposition the weight(s) according to weight-distribution balance profile. For example, a remote user control component (e.g., remote communication device 300) may receive the data signal and activate a remote indicator that conveys information to a user.

In some embodiments, the processor may output the signal (e.g., via the output module 345 or the onboard antenna 257 and the bi-directional wireless link 355) when moving around repositionable weights alone will not achieve balance. For example, the processor cause the indicator to display a message to an operator (e.g., on an onboard or remote display) indicating that one or more repositionable weights need to be added to and/or removed from the drone in order to achieve the desired balance adjustment.

The output provided by the drone processor in block 1452 may also be an output to another processor (either onboard or remote from the drone) to enable or prompt that other processor to perform further adjustments to the weight-distribution balance profile. For example, the output may be to a processor on the drone that controls an actuator that is configured to move the repositionable weights. As another example, the output may be to a processor on the ground, such as a service or support robot or machine on or near a drone launch pad, which may be configured to automatically adjust the position of the repositionable weights in response to the output signal. As a further example, the output may be to a processor of a packaging and handling facility that is configured to assemble a payload package based on information contained within the output signal before the payload is delivered to the drone for pickup.

The control unit may repeat the operations of the method 1450 following the output in block 1452, receiving further weight-distribution inputs in block 1410.

The foregoing method descriptions and the process flow diagrams are provided merely as illustrative examples and are not intended to require or imply that the steps of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present invention is not intended to be limited to the embodiments shown herein but is to be accorded the widest scope consistent with the following claims and the principles and novel features disclosed herein.

What is claimed is:

1. A weight distribution apparatus for adjusting a center of mass of a drone, comprising:
   a first balance track configured to extend outwardly from a central region of the drone, wherein the first balance track is disposed on an extension arm of the drone, the extension arm extends laterally from the central region and an air propulsion unit is mounted on a distal end of the extension arm; and
   a repositionable weight secured along the first balance track, wherein the repositionable weight comprises an electronic component.

2. The weight distribution apparatus of claim 1, wherein the repositionable weight wraps around at least a portion of the extension arm using an essential structural shape of the extension arm as the first balance track.

3. The weight distribution apparatus of claim 1, wherein the first balance track comprises a plurality of weight-balance fixation positions comprising a series of apertures extending through the extension arm.

4. The weight distribution apparatus of claim 1, wherein the repositionable weight is configured to ride along guide elements included on the first balance track.

5. The weight distribution apparatus of claim 1, wherein the electronic component comprises at least one of an energy cell, an actuator, an indicator, a circuit element, a sensor, and a camera.

6. The weight distribution apparatus of claim 1, further comprising:
   a control unit configured to activate the electronic component, wherein the control unit is fixed to the repositionable weight.

7. The weight distribution apparatus of claim 1, further comprising:
   a control unit configured to activate the electronic component, wherein the control unit is remote from the repositionable weight.

8. The weight distribution apparatus of claim 1, further comprising a control unit configured to activate the electronic component, wherein the control unit comprises:
   a radio frequency transceiver, and
   a processor coupled to the radio frequency transceiver and configured with processor-executable instructions to activate a movement of the repositionable weight from a first one of a plurality of weight-balance fixation positions to a second one of a plurality of weight-balance fixation positions in response to receiving an activation signal via the radio frequency transceiver.

9. The weight distribution apparatus of claim 1, wherein the repositionable weight is configured to perform a function using the electronic component in addition to adjusting the center of mass of the drone.

10. The weight distribution apparatus of claim 1, wherein the repositionable weight is removably secured to at least one of a plurality of weight-balance fixation positions.

11. The weight distribution apparatus of claim 1, further comprising:
    a second balance track extending outwardly from the central region along a second axis that is different from a first axis of the first balance track.

12. The weight distribution apparatus of claim 1, wherein the first balance track is configured to change length for changing the repositionable weight from a first weight-balance fixation position to a second weight-balance fixation position.

13. The weight distribution apparatus of claim 1, wherein the first balance track is configured to rotate about a vertical central axis of the drone.

14. A weight distribution apparatus for adjusting a center of mass of a drone, comprising:
    means for adjusting the center of mass of the drone configured to extend outwardly from a central region of the drone, wherein the means for adjusting the center of mass of the drone is disposed on an extension arm of the drone, wherein the extension arm extends laterally from the central region and a means for propelling air is mounted on a distal end of the extension arm; and
    means for securing an electronic component adding weight to the drone along the means for adjusting the center of mass of the drone.

15. A weight distribution apparatus for adjusting a center of mass of a drone, comprising:
    a first balance track configured to extent outwardly from a central region of the drone;
    a second balance track configured to extend outwardly from the central region along a second axis that is different from a first axis of the first balance track; and
    a repositionable weight configured to be secured along one or more of the first balance track or the second balance track, wherein the repositionable weight comprises a first weight secured to the first balance track and a second weight secured to the second balance track.

16. The weight distribution apparatus of claim 15, wherein the repositionable weight wraps around at least a portion of an extension arm of the drone using an essential structural shape of the extension arm as the first balance track, wherein a distal end of the extension arm supports an air propulsion unit.

17. The weight distribution apparatus of claim 15, wherein the first balance track comprises a plurality of weight-balance fixation positions comprising a series of apertures extending through an extension arm of the drone, wherein a distal end of the extension arm supports an air propulsion unit.

18. The weight distribution apparatus of claim 15, wherein the repositionable weight is configured to ride along guide elements included on the first balance track.

19. The weight distribution apparatus of claim 15, wherein the repositionable weight includes an electronic component.

20. The weight distribution apparatus of claim 19, further comprising:
    a control unit configured to activate the electronic component, wherein the control unit is fixed to the repositionable weight.

21. The weight distribution apparatus of claim 19, further comprising:

a control unit configured to activate the electronic component, wherein the control unit is remote from the repositionable weight.

22. The weight distribution apparatus of claim 15, wherein the repositionable weight is removably secured to at least one of a plurality of weight-balance fixation positions.

23. The weight distribution apparatus of claim 15, wherein the first axis and the second axis are perpendicular to one another.

24. The weight distribution apparatus of claim 15, wherein the first balance track is configured to change length for changing the repositionable weight from a first weight-balance fixation position to a second weight-balance fixation position.

25. The weight distribution apparatus of claim 15, wherein the first balance track is configured to rotate about a vertical central axis of the drone.

26. The weight distribution apparatus of claim 15, wherein in response to a change in a weight-distribution balance profile of the drone, in which a payload is added to or removed from the drone, the repositionable weight is configured to be repositioned to a different one of a plurality of weight-balance fixation positions for restoring the weight-distribution balance profile.

27. The weight distribution apparatus of claim 15, wherein a plurality of weight-balance fixation positions are arranged along one or more of the first balance track or the second balance track such that changing the repositionable weight from a first one of the plurality of weight-balance fixation positions to a second one of the plurality of weight-balance fixation positions changes the center of mass of the drone.

28. A weight distribution apparatus for adjusting a center of mass of a drone, comprising:
   first means for adjusting the center of mass of the drone configured to extend outwardly from a central region of the drone;
   second means for adjusting the center of mass of the drone configured to extend outwardly from the central region along a second axis that is different from a first axis of the first means for adjusting the center of mass of the drone; and
   means for adding weight to the drone configured to be secured along one or more of the first or second means for adjusting the center of mass of the drone, wherein the means for adding weight to the drone comprises a first means for adding a first weight to the first means for adjusting the center of mass of the drone and second means for adding a second weight to the second means for adjusting the center of mass of the drone.

* * * * *